(12) United States Patent
Masunaga et al.

(10) Patent No.: US 6,840,565 B2
(45) Date of Patent: Jan. 11, 2005

(54) DOOR FRAME FOR A VEHICLE

(75) Inventors: Satoshi Masunaga, Anjo (JP); Hiroaki Yamasaki, Toyota (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 10/693,913

(22) Filed: Oct. 28, 2003

(65) Prior Publication Data

US 2004/0130179 A1 Jul. 8, 2004

(30) Foreign Application Priority Data

Oct. 28, 2002 (JP) ........................................ 2002-312297

(51) Int. Cl.$^7$ .................................................. B60J 5/02
(52) U.S. Cl. .................................. 296/146.5; 296/146.9
(58) Field of Search ............................. 296/201, 146.2, 296/146.5, 146.9, 146.16, 146.1

(56) References Cited

U.S. PATENT DOCUMENTS

| | | | |
|---|---|---|---|
| 5,199,761 A | * 4/1993 | Dannecker et al. | 296/146.16 |
| 6,007,140 A | * 12/1999 | Heitmann et al. | 296/146.9 |
| 6,119,405 A | * 9/2000 | Disson et al. | 296/146.5 |
| 6,279,987 B1 | * 8/2001 | Keeney et al. | 296/146.9 |
| 6,641,204 B2 | * 11/2003 | Ogawa et al. | 296/146.9 |
| 2002/0073625 A1 | * 6/2002 | Jennings | 296/146.5 |
| 2002/0140251 A1 | * 10/2002 | Davis et al. | 296/146.16 |
| 2003/0071482 A1 | * 4/2003 | Shimizu | 296/146.9 |

FOREIGN PATENT DOCUMENTS

| | | |
|---|---|---|
| JP | 9-71184 | 3/1997 |
| JP | 9-216583 | 8/1997 |
| JP | 10-297280 | 11/1998 |
| JP | 11-129758 | 5/1999 |
| JP | 11-342745 | 12/1999 |

* cited by examiner

Primary Examiner—Jason Morrow
(74) Attorney, Agent, or Firm—Finnegan, Henderson, Farabow, Garrett & Dunner, LLP

(57) ABSTRACT

A door frame for a vehicle comprises a frame structure portion including a hollow portion having a hollow cross section extending in longitudinal direction and a flange portion extending from the outer profile of the hollow portion and an outer surface portion engaged with the flange portion to be integrally formed with the frame structure portion, wherein the frame structure portion and the outer surface portion are formed by separate different plate members, and the outer surface portion is bended and engaged with the frame structure portion to be integrated together. The plate member of the outer surface portion is thicker than the plate member of the frame structure portion. A material of the plate of the outer surface portion is different from a material of the frame structure portion.

4 Claims, 3 Drawing Sheets

DOOR FRAME FOR A VEHICLE

This application is based on and claims priority under 35 U.S.C. § 119 with respect to Japanese Application No. 2002-312297 filed on Oct. 28, 2002, the entire content of which is incorporated herein by reference.

FIELD OF THE INVENTION

This invention generally relates to a door frame for a vehicle.

BACKGROUND OF THE INVENTION

FIG. 1 shows a configuration of a known door 10 for the vehicle. A door frame 1 forms as an edge of a window portion 4 of the door 10. A cross sectional view of a known common door frame 1 along a line A—A in FIG. 1 is shown in FIG. 5 as an example. Specifically, the door frame 1 made by bending a plate member comprises a frame structure portion 5 with a hollow portion 51 for being provided with its stiffness and a flange portion 54 extending from the outer portion in one direction, and an outer surface portion 6 formed on the top portion of the flange portion 54 in FIG. 5. The outer surface portion 6 is formed in approximately flat shape and assembled to be viewed from outside of the vehicle. A glass run groove 52 is formed on the right of the flange portion 54 in horizontal direction in FIG. 5 whereinto a glass run 31 inserted for engaging with a window glass 3. A seal groove 53 is formed on the left of the flange portion 54 for supporting a seal material 8 between the door 10 and the vehicle body. In this configuration, the flange portion 54 includes three layered palates which are welded each other at a welded place 9 positioned at an approximately center portion of the flange portion 54 as shown in FIG. 5.

According to the door frame 1 which is generally configured as described above, many kinds of inventions have been reported by which the weight of the door frame 1 is saved. One example of these fames comprises individually formed frame structure portion 5 and outer surface portion 6, and they are welded each other, so that each sizes of the hollow portion 51 and the outer surface portion 6 in cross sectional form are adapted to be changed in longitudinal direction. (e.g. Tokukaihei 9-216583 kouhou)

In addition, another example of these frames is formed by a sheet of plate member which is made of welded plates with difference thickness, and bended in aforementioned form. (e.g. Tokukaihei 10-297280 kouhou)

However, in the known aforementioned frame of the vehicle door, a flange portion comprising three-layered plates, which result in increasing its weight, is not necessarily for ensuring the strength of the frame. In addition, a distortion of the flange portion generated by the welding causes a distortion on the outer surface portion; as a result, it becomes difficult to achieve a smooth outer surface portion with a quality required for vehicle appearance.

Accordingly, it is an object of the present invention to provide an improved door frame structure for ensuring a quality of the outer surface portion and weight saving in which the outer surface portion is not affected by the distortion.

SUMMARY OF THE INVENTION

A door frame for a vehicle comprises a frame structure portion including a hollow portion with a hollow cross section extending in longitudinal direction and a flange portion extending from the outer profile of the hollow portion and an outer surface portion engaged with the flange portion to be integrally formed with the frame structure portion, wherein the frame structure portion and the outer surface portion are formed by separate different plate members, and the outer surface portion is bended and engaged with the frame structure portion to be integrated together. The plate member of the outer surface portion is thicker than the plate member of the frame structure portion. A material of the plate of the outer surface portion is different from a material of the frame structure portion.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Referring now to an embodiment of the invention with reference to the attached drawings FIG. 1 through FIG. 4.

Figure 1:
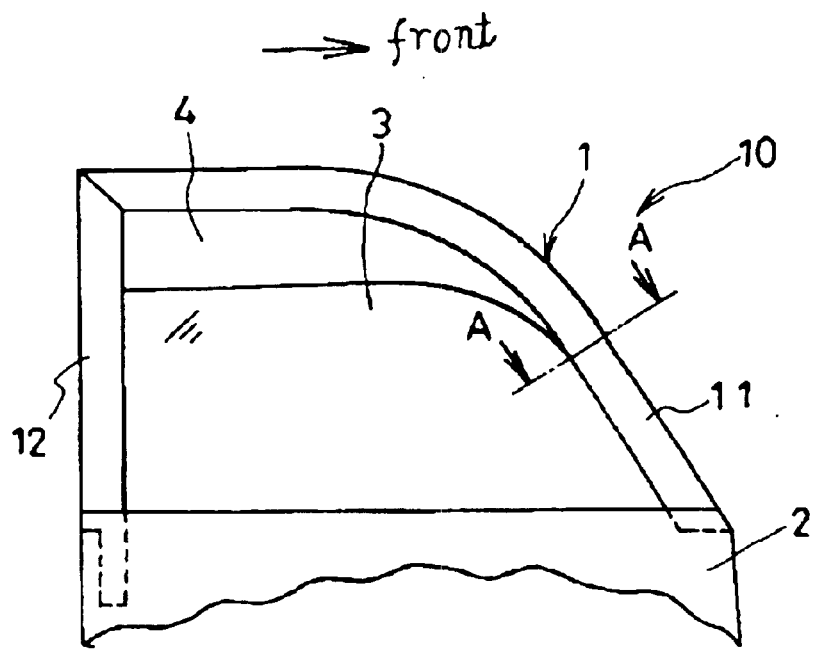
FIG. 1 illustrates a side view of a vehicle door including a frame structure according to the invention.

FIG. 1 indicates an example of a common vehicle door. A door 10 includes a door frame 1 on its upper portion as a frame to support and guide a window glass 3 to move in vertical direction for opening and closing a window portion 4. A front frame portion 11 is formed on the front and upper portion of the door frame 1(right in FIG. 1), and a rear frame portion 12 is formed on the rear portion of the door frame 1 (left in FIG. 1). The rear end of the front frame portion 11 in longitudinal direction and the upper end of the rear frame portion 12 are adapted to be welded, and the door frame 1 is fixed to the door body 2.

Figure 2:
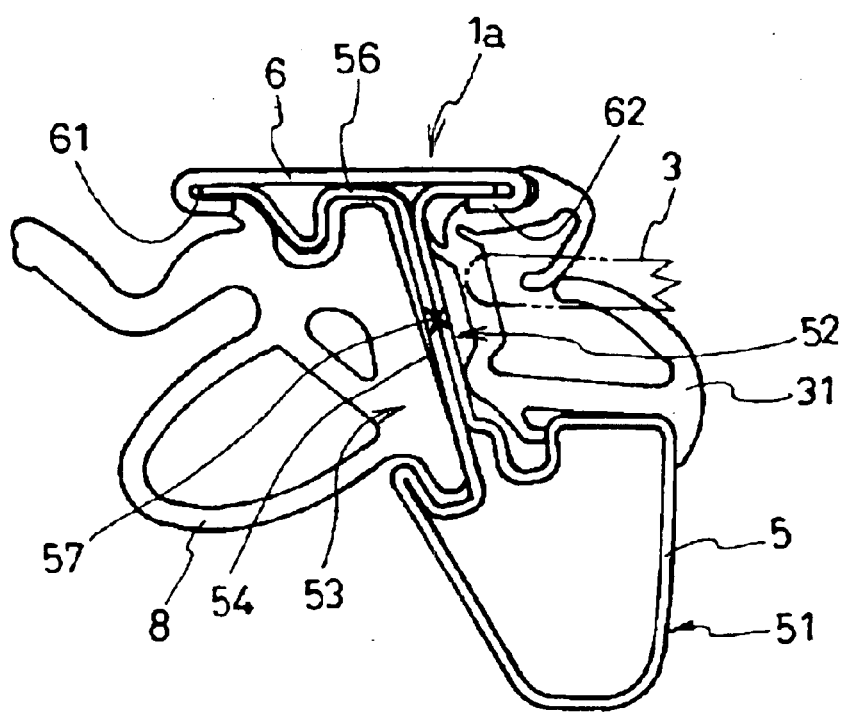
FIG. 2 illustrates a cross-sectional view along a line A—A in FIG. 1.

FIG. 2 shows a cross-sectional view of the front frame portion 11 along a line A—A perpendicular to the longitudinal direction of the front frame portion 11. A frame structure portion 5 is formed by bending a plate member. The front frame portion 11 includes the frame structure portion 5, and the frame structure portion 5 includes the hollow portion 51 provided on lower portion in FIG. 2 and the flange portion 54 extending toward the upper portion in FIG. 2, in other words, toward the outer of the vehicle as being layered with other portion of the plate member. The top portions of the layered flanges 54 separate to right and left at upper portion in FIG. 2, and the engaging portion 56 with a predetermined width extending in longitudinal direction of the front frame portion 11 (in upright direction relative to FIG. 2) is formed.

According to the cross section view of the door frame 1 shown by FIG. 2, the glass run groove 52 are formed on right of the flange portion 54 whereinto a glass run 31 inserted for guiding a window glass 3, and the seal groove 53 are formed on left of the flange portion 54 in FIG. 2 for supporting the seal material 8 between the door 10 and the vehicle body (not shown). The layered plate members are welded at the weld portion 57 which is approximately center portion of the flange portion 54.

The front frame portion 11 includes the outer surface portion 6 being adapted to cover the top portion of the engaging portion 56 in FIG. 2. The outer surface portion 6 is formed in approximately flat shape form for ornamental purpose, and each ends of the outer surface portion 6 are bended for covering the engaging portion 56 and being fixed to the engaging portion 56. Thus, the flange portion 54 and the outer surface portion 6 are formed individually and connected each other by bending the outer surface portion 6 without welding, so that the outer surface portion 6 is not affected by a welding distortion of the flange portion 54.

The aforementioned form in cross-sectional view is also applied to the rear frame 21 for supporting the window glass 3 at the window portion 4.

Figure 3:
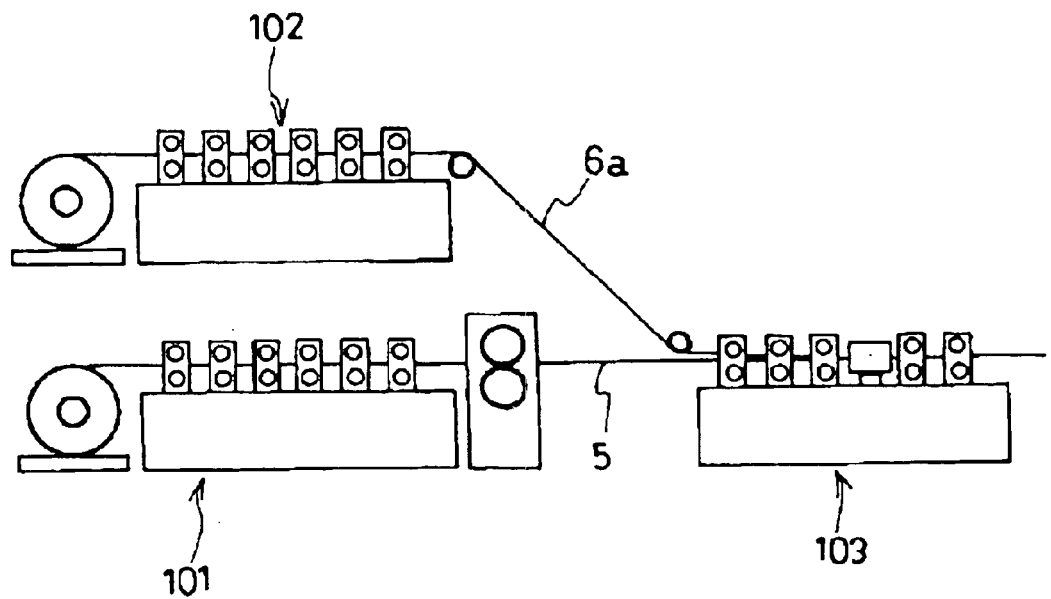
FIG. 3 illustrates a roll molding equipment to produce the frame structure according to the invention.
Figure 4:
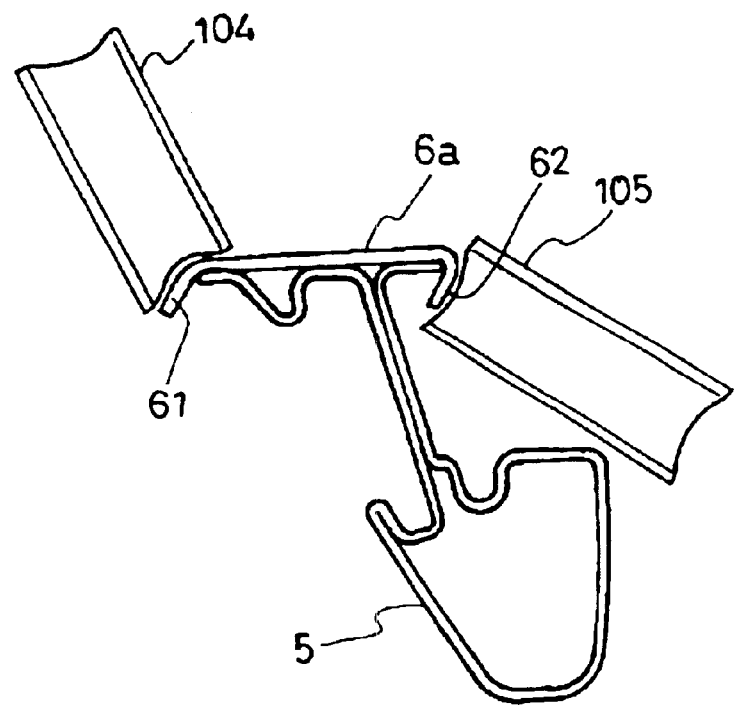
FIG. 4 illustrates a process of the roll molding of the frame structure according to the invention.
Figure 5:
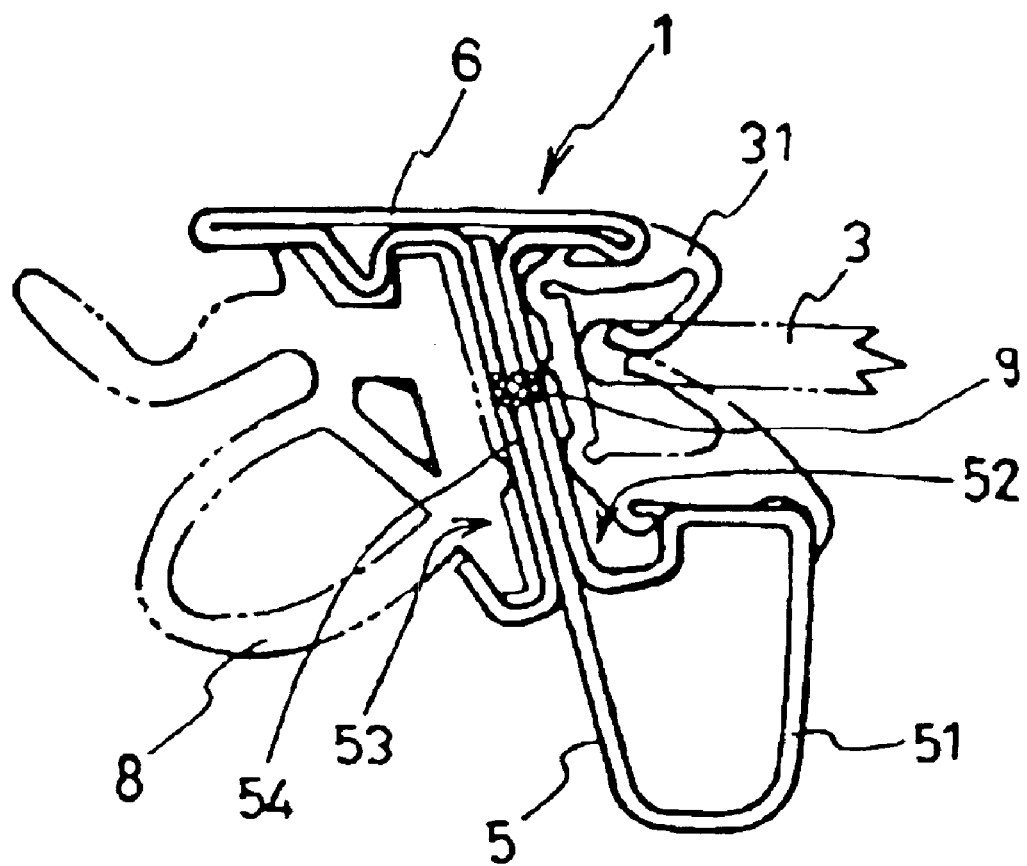
FIG. 5 illustrates a cross-sectional view of a known frame structure.

A process of manufacture of the door frame 1 as described above is explained with reference to the attached drawings FIG. 3 and FIG. 4.

As mentioned above, the frame structure portion 5 and the outer surface portion 6 are separated members. As shown in FIG. 3, the frame structure portion 5 is formed by a first roll molding equipment 101, and an intermediate process form 6a of the outer surface portion 6 is formed by a second roll molding equipment 102. The frame structure portion 5 which is come out through the first roll molding equipment 101 and the intermediate process form 6a which is come out through the second molding equipment 102 are combined as shown in FIG. 4 and supplied to the third roll molding equipment 103. Edge portions of 61 and 62 are respectively bent for enfolding the edge portions of the engaging portion 56 by a series of plural rollers 104 and rollers 105 and formed as shown in FIG. 2.

The frame material is cut in a predetermine length, bending process is applied to the frame material, and each edges of the frame material are bended for forming the edge portions. The front frame portion 11 is formed in this way. The edge portions of the rear frame portion 12 are formed in a predetermined shape and welded with the front frame portion 11.

The frame structure portion 5 of the invention provides the hollow portion 51 whose size and shape are designed for keeping the strength of the door frame 1 without using thicker plate member, so that the door frame 1 becomes lighter. On the other hand, it is preferable for the outer surface portion 6 to use a thicker plate member for securing a favorable flat condition. Thus the frame structure 5 and the outer surface portion 6 can use plate members of different thickness because of being provided separately at the door fame 1, so that the door frame 1 becomes lighter with a favorable outer surface portion.

In addition, different materials can be applied to the frame structure 5 and the outer surface portion 6, as a result, a range of option for the layout and the exterior design expands.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A door frame for a vehicle comprising:
    a single-piece roll bent frame structure portion including a hollow portion having a hollow cross section extending in longitudinal direction and a flange portion extending from an outer profile of the hollow portion and
    an outer surface portion engaged with the flange portion and integral with the frame structure portion;
    wherein the frame structure portion and the outer surface portion consist essentially of two separate different layered plate members, and wherein the outer surface portion is bent and engaged with the frame structure portion to be integrated together.

2. A door frame for a vehicle according to the claim 1, wherein the plate member of the outer surface portion is thicker than the plate member of the frame structure portion.

3. A door frame for a vehicle according to the claim 1, wherein a material of the plate of the outer surface portion is different from a material of the frame structure portion.

4. A door frame for a vehicle according to the claim 2, wherein the material of the plate of the outer surface portion is different from the material of the frame structure portion.

* * * * *